US010764059B2

(12) United States Patent
Hernacki et al.

(10) Patent No.: US 10,764,059 B2
(45) Date of Patent: Sep. 1, 2020

(54) COMMUNICATIONS SECURITY SYSTEMS AND METHODS

(71) Applicant: Intel Corporation, Santa Clara, CA (US)

(72) Inventors: Brian J. Hernacki, Santa Clara, CA (US); Sumanth Naropanth, Bangalore (IN); Chandra Prakash Gopalaiah, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 15/169,245

(22) Filed: May 31, 2016

(65) Prior Publication Data
US 2017/0346636 A1 Nov. 30, 2017

(51) Int. Cl.
*H04L 9/32* (2006.01)
*H04W 12/02* (2009.01)
(Continued)

(52) U.S. Cl.
CPC .......... *H04L 9/3242* (2013.01); *H04L 9/0822* (2013.01); *H04L 9/14* (2013.01); *H04L 63/0428* (2013.01); *H04L 63/06* (2013.01); *H04L 63/061* (2013.01); *H04L 63/08* (2013.01); *H04L 63/0876* (2013.01); *H04W 12/02* (2013.01);
(Continued)

(58) Field of Classification Search
CPC .................................................. H04L 9/3242
See application file for complete search history.

(56) References Cited

U.S. PATENT DOCUMENTS 6,487,661 B2* 11/2002 Vanstone .............. H04L 9/0844
380/278
6,539,479 B1* 3/2003 Wu ....................... H04L 9/0844
380/227
(Continued)

FOREIGN PATENT DOCUMENTS

| CN | 109075966 A | 12/2018 |
|---|---|---|
| DE | 112017002726 T5 | 2/2019 |
| WO | WO-2017209885 A1 | 12/2017 |

OTHER PUBLICATIONS

"International Application Serial No. PCT/US2017/030632, International Search Report dated Aug. 8, 2017", 3 pgs.
(Continued)

*Primary Examiner* — Peter C Shaw
(74) *Attorney, Agent, or Firm* — Schwegman Lundberg & Woessner, P.A.

(57) ABSTRACT

Various examples are directed to systems and methods for communications security. For example, a computing device may generate a connection between the computing device and a client device. A first application executing at the computing device may send a first application session key to the client device via the connection. The first application may perform a cryptographic operation on a first message based at least in part on the first application session key to generate a first cryptographic result and send the first cryptographic result to the client device via the connection. The first application may receive a second cryptographic result from the client device via the connection and determine that the second cryptographic result was obtained with the first application session key.

27 Claims, 11 Drawing Sheets

(51) Int. Cl.
    *H04L 9/08*         (2006.01)
    *H04L 29/06*      (2006.01)
    *H04L 9/14*         (2006.01)
    *H04W 12/04*     (2009.01)
    *H04W 12/06*     (2009.01)

(52) U.S. Cl.
    CPC ........... *H04W 12/04* (2013.01); *H04W 12/06* (2013.01); *H04L 2209/80* (2013.01)

(56) References Cited

U.S. PATENT DOCUMENTS

| | | | |
|---|---|---|---|
| 8,060,745 | B2 | 11/2011 | Glickman |
| 9,191,375 | B2 * | 11/2015 | Kaler ................. G06F 21/41 |
| 2010/0223468 | A1 * | 9/2010 | Sun ................. H04L 63/062 |
| | | | 713/168 |
| 2013/0061037 | A1 | 3/2013 | Zhang et al. |
| 2014/0206289 | A1 | 7/2014 | Rahman et al. |
| 2015/0134969 | A1 * | 5/2015 | Kim ................. H04L 9/3247 |
| | | | 713/176 |
| 2015/0324559 | A1 * | 11/2015 | Boss ................. H04L 63/20 |
| | | | 726/1 |
| 2016/0034969 | A1 | 2/2016 | Mazurov |
| 2016/0037345 | A1 | 2/2016 | Margadoudakis |
| 2016/0080372 | A1 | 3/2016 | Martin et al. |
| 2016/0087950 | A1 * | 3/2016 | Barbir ............... H04L 63/062 |
| | | | 713/171 |
| 2016/0088453 | A1 * | 3/2016 | Joo ................... H04W 4/16 |
| | | | 455/414.1 |
| 2016/0253521 | A1 * | 9/2016 | Esmailzadeh ......... H04L 63/308 |
| | | | 726/4 |

OTHER PUBLICATIONS

"International Applications Serial No. PCT/US2017/030632, Written Opinion dated Aug. 8, 2017", 9 pgs.

"International Application Serial No. PCT/US2017/030632, International Preliminary Report on Patentability dated Dec. 13, 2018", 11 pgs.

* cited by examiner

COMMUNICATIONS SECURITY SYSTEMS AND METHODS

TECHNICAL FIELD

Examples described herein generally relate to systems and methods for wireless security.

BACKGROUND

In wireless communications, it is desirable to prevent messages from being intercepted and to ensure that received communications are from the intended party.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

In the following description, for purposes of explanation, numerous specific details are set forth in order to provide a thorough understanding of some examples. It will be evident, however, to one skilled in the art that the present disclosure may be practiced without these specific details.

Various examples described herein are directed to systems and methods for implementing communications security, for example, at the application level. Many inter-device communication protocols, such as Bluetooth®, Bluetooth® LE, and others, utilize stateless connections. For example, a computing device may create a system-level connection with a client device. The system-level connection utilizes security measures, such as encryption, to authenticate messages sent via the connection and to prevent other computing devices and/or client devices from intercepting and reading the messages. Some operating systems, however, allow multiple applications to utilize a system-level connection to a client device. Accordingly, even though the system-level connection may provide security with respect to other devices, it may not provide protection from other applications, such as malware, that are executing at the client device.

In various examples, an application executing at a computing device may establish an application-level connection with a client device. The computing device, for example an operating system or other suitable connection circuit, establishes a system-level connection with the client device. The application generates a separate application-level connection with the client device over the system-level connection. For example, the application may generate an application session key and provide the application session key to the client device via the system-level connection. Messages sent between the client device and the application are encrypted according to the application session key, or a derivative thereof. The client device may be programmed to respond only to instructions that are encrypted according to the application session key. In this way, other applications executing at the computing device may be prevented from accessing the client device.

Figure 1:
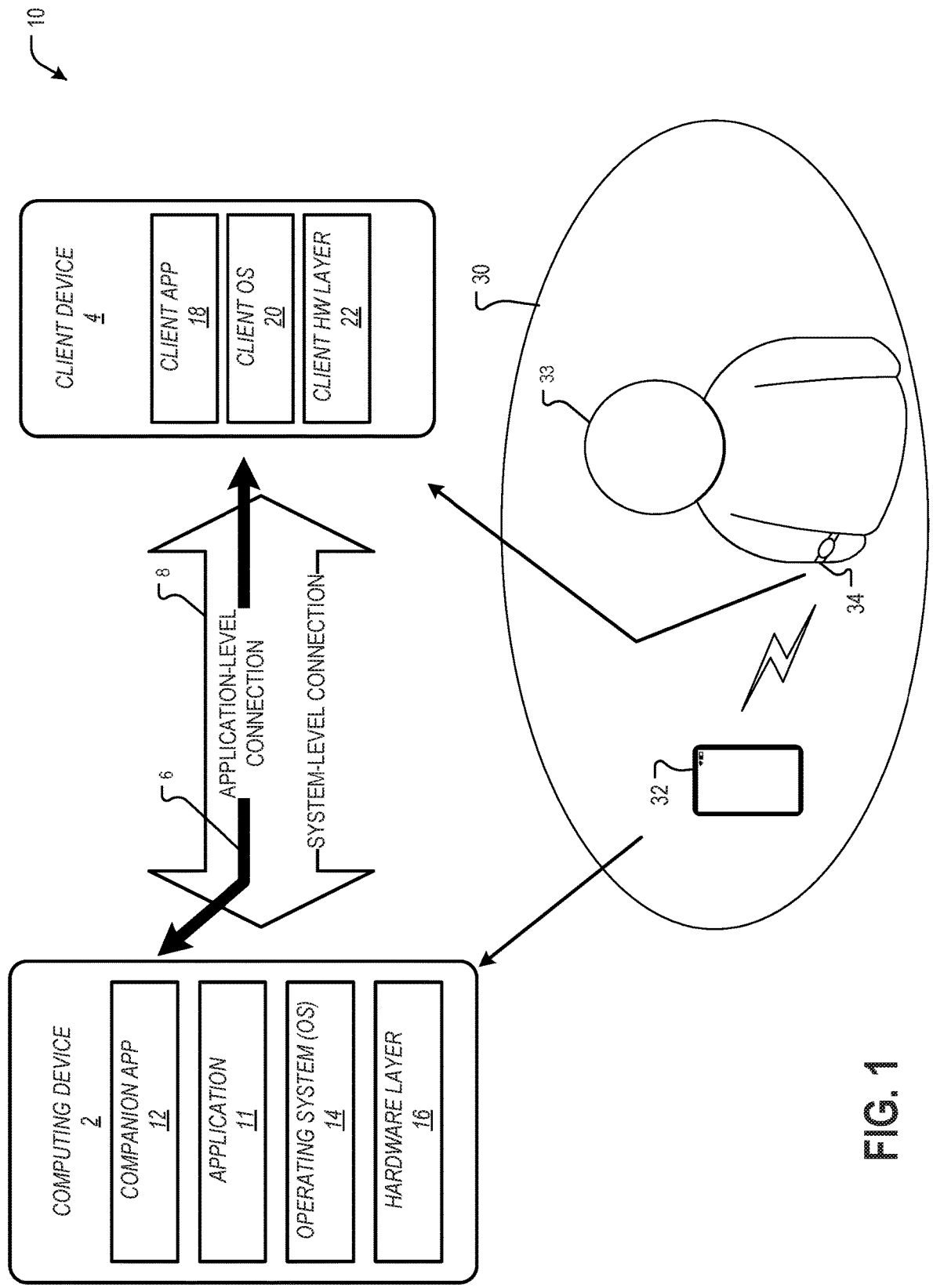
FIG. 1 is a diagram showing one example of an environment for an application-level connection to a client device.

FIG. 1 is a diagram showing one example of an environment 10 for an application-level connection to a client device. The environment 10 includes a computing device 2 and a client device 4. The computing device 2 establishes a system-level connection 8 with the client device 4. For example, the system-level connection 8 may be established and/or administered by an operating system (OS) 14 of the computing device 2. The system-level connection 8 may be made over any suitable wired and/or wireless communication medium. In some examples, including some examples utilizing a Bluetooth® standard, the system-level connection may be made over a wireless medium generated by direct wireless communication between a transceiver at the computing device 2 and a transceiver at the client device 4. A companion application 12 executing at the computing device 2 communicates with the client device 4 utilizing an application-level connection 6 within the system-level connection 8. In this way, as described herein, the companion application 12 may communicate with the client device 4 in a manner that is inaccessible to other applications, such as the application 11.

The computing device 2 may be any device suitable for establishing a system-level connection 8 with the client device 4. Examples of the computing device 2 include, a smart phone, a tablet computer, a laptop computer, a desktop computer, a wearable computer device, etc. The computing device 2 comprises a hardware layer 16. The hardware layer 16 includes at least one processor and suitable memory in communication with the processor. The hardware layer 16 may also comprise one or more input/output devices for implementing the system-level connection 8, such as a transceiver for wireless communication and/or an output port for wired communication. An example configuration for the hardware layer 16 is provided herein with reference to FIG. 2.

The computing device 2 executes an operating system 14 and a companion application 12. The companion application 12 may be an application that is configured to communicate with the client device 4. For example, if the client device 4 includes a pedometer, the companion application 12 may be configured to communicate with the client device 4 to receive and track steps walked by the user. In some examples, the computer device 2 also executes additional applications, such as the application 11. The computing device 2 may utilize any suitable operating system 14 including, for example, a Windows® operating system, an iOS™ or other OS operating system from Apple, Inc., an Android™ operating system, a LINUX operating system, etc. Applications 11, 12 may be client-side and/or web applications. The applications 11, 12 may access the hardware layer 16 through the OS 14. For example, the OS 14 may provide the applications 11, 12 with access to a transceiver, output port or other hardware for communicating via the system-level connection 8.

The client device 4 may include a client hardware layer 22. The client hardware layer 22 may include at least one processor and suitable memory in communication with the processor. The client hardware layer 22 may also include one or more input/output devices for communicating with the computing device 2 to implement the system-level connection 6 and application-level connection 8. The client device 4, in some examples, may also execute a client OS 20 and a client application 18. The client OS 20 may be any suitable OS. In some examples, the client device 4 may utilize an OS optimized for low power devices such as, for example, Android Wear™, Tizen®, and/or a Real Time Operating System (RTOS).

FIG. 1 also shows an example implementation 30 of the environment 10 including an example computing device 32 and an example client device 34. The example computing device 32 is a mobile phone and the example client device 34 is a wearable computing device, shown positioned on a wrist of a user 33. The client device 34 may include one or more sensors for detecting motion and/or biometric functions of the user 33, such as heart rate, breathing rate, etc. The client device 34 may communicate with a companion application at the computing device 32 to provide captured data to the user 33. The implementation 30 is just one example for implementing the communications security systems and methods described.

Figure 2:
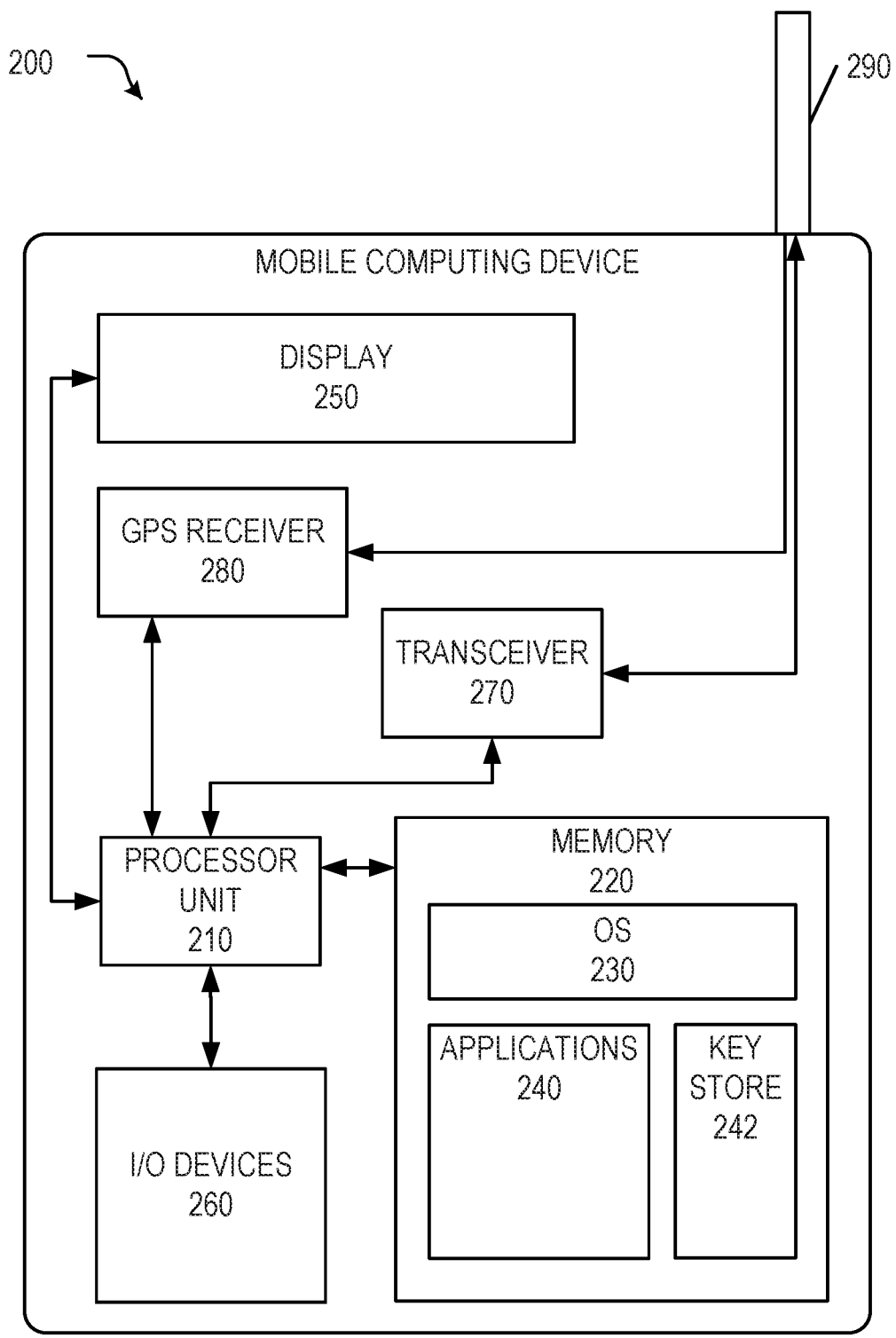
FIG. 2 is a block diagram showing an example architecture of a mobile computing device.

FIG. 2 is a block diagram showing an example architecture 200 of a mobile computing device. In some examples, the computing devices 2, 32 and/or client devices 4, 34 may be implemented according to the architecture 200. The architecture 200 comprises a processor unit 210. The processor unit 210 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 220, such as a Random Access Memory (RAM), a Flash memory, or other type of memory or data storage, is typically accessible to the processor. The memory 220 may be adapted to store an operating system (OS) 230, as well as applications 240, such as, for example, the applications 11, 12, 18 described above. The memory 220 may also include a key store 242. The key store 242 may be a location or set of locations at the memory where an application may store secure data, such as encryption keys, that are not accessible to other applications. In some examples, the key store 242 is managed by the OS 230. For example, when the OS 230 is an iOS operating system, the key store 242 may be implemented by the Keychain® feature of iOS. In examples where the OS 230 is an Android™ operating system, the key store 242 maybe implemented by the keystore features of Android™.

The processor unit 210 may be coupled, either directly or via appropriate intermediary hardware, to a display 250 and to one or more input/output (I/O) devices 260, such as a keypad, a touch panel sensor, a microphone, and the like. Similarly, in some examples, the processor 210 may be coupled to a transceiver 270 that interfaces with an antenna 290. The transceiver 270 may be configured to both transmit and receive cellular network signals, wireless data signals, or other types of signals via the antenna 290, depending on the nature of the mobile computing device implemented by the architecture 200. Although one transceiver 270 is shown, in some examples, the architecture 200 includes additional transceivers. For example, a wireless transceiver may be utilized to communicate according to an IEEE 802.11 specification, such as Wi-Fi and/or to a short range communication medium, such as Bluetooth®, near field communication (NFC), etc. Some short range communication mediums, such as NFC, may utilize a separate, dedicated transceiver. Further, in some configurations, an optional GPS receiver 280 makes use of the antenna 290 to receive GPS signals.

Figure 3:
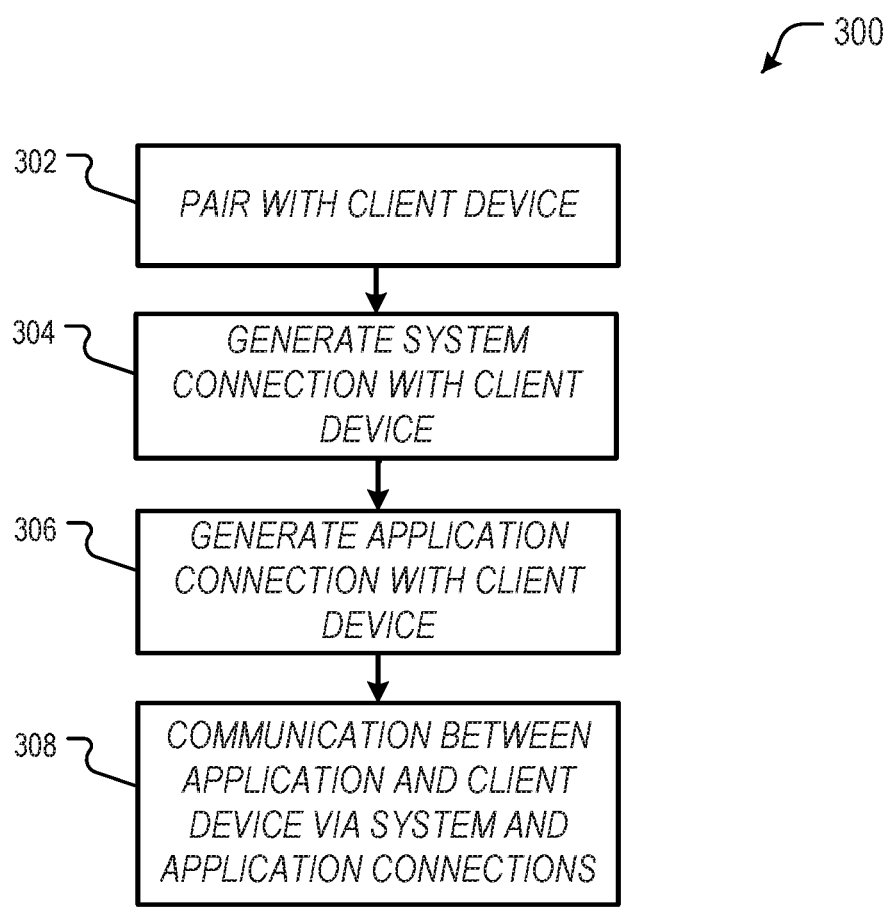
FIG. 3 is a flow chart showing one example of a process flow that may be executed in the environment of FIG. 1 to implement communications security as described herein.

FIG. 3 is a flow chart showing one example of a process flow 300 that may be executed in the environment 10 to implement communications security as described herein. The process flow 300 is described in conjunction with the example environment 10 of FIG. 1, including the computing device 2 and the client device 4. The process flow 300, however, may be executed to implement communications security between any two suitable devices and/or applications.

Optionally, at action 302, the computing device 2 (e.g., the operating system 14) may pair with the client device. For example, some communications media, such as Bluetooth® utilize a two-stage protocol. At the first stage, before establishing a secure connection, the computing device 2 and client device 4 may authenticate to one another in a process sometimes referred to as pairing. In some examples, the computing device 2 provides a password (e.g., an alphanumeric code) to the client device 4 the client device. The client device 4 compares the alphanumeric code to a locally-stored reference code. If the codes match, the client device 2 may accept the pairing. In some examples, a user provides the password to the computing device manually, such as through an I/O device of the computing device 2. Any other suitable authentication may be used to implement the pairing. Also, in examples utilizing a communications that does not include a two-stage protocol, action 302 may be omitted.

At action 304, the computing device 2 and/or client device 4 may generate a system-level connection 8. For example, the OS 14 of the computing device 2 may negotiate one or more encryption keys with the client device 4 (e.g., a client OS 20 and/or client application 18 thereof). Any suitable key exchange protocol may be used including, for example, Diffie-Hellman, Secure Simple Pairing model, Just Works, Passkey Entry, etc. At the conclusion of the connection process, the computing device 2 (e.g., the OS 14) and the client device 4 may each possess a system encryption key. The system encryption key may be a symmetric key and may be used to authenticate to one another and/or to encrypt messages. In Bluetooth® implementations, for example, the system encryption key may be referred to as the link key. Messages transmitted between the computing device 2 and client device 4 via the system-level connection may be encrypted with the system encryption key.

Once the system-level connection is established, the OS 14 may provide applications 11, 12 executing at the computing device 2 with access to the system-level connection 8. For example, an application may query the OS 14 to provide names of client devices, such as client 4, that are paired with and/or connected to the computing device 2. The OS 14 may return a list of paired and/or connected devices. The application may request that a message be sent to the client device 4, for example encrypted with the system encryption key. In some examples, an application may also request that the OS 14 initiate the pairing process described above.

At action 306, the companion application 12 and client device 4 may generate an application-level connection 6 with the client device 4. For example, the companion application 12 may generate an application session key and provide the application session key to the client device 4. The client device 4 and companion application 12 may utilize the application session key, as described herein to authenticate to one another and to encrypt messages transferred between the companion application 12 and the client device 4.

At action 308, the companion application 12 and client device 4 may exchange messages via the application-level connection 6. For example, the companion application 12 may perform a first cryptographic operation on the first message based at least in part on the application session key to generate a first cryptographic result and send the cryptographic result to the client device 4. The client device 4 may perform a second cryptographic operation to authenticate the first message.

In some examples, the cryptographic operations are encryption and decryption. For example, the first cryptographic operation may include the companion application 12 encrypting the first message with the application session key. The first cryptographic result may be an encrypted form of the first message. The second cryptographic operation may include the client device 4 decrypting the first cryptographic result to produce the first message. Similarly, in some examples, the client device 4 may encrypt a second message and send the encrypted second message to the companion application 12. The companion application 12 may decrypt the encrypted second message to generate the second message.

In some examples, in addition to or instead of encrypting the messages, the companion application 12 and client device 4 may utilize a hash-based message authentication code (HMAC). For example, the first cryptographic operation may include applying a hash function to the first message using the application session key. Any suitable hash function may be used including, for example, those described herein. The first cryptographic result may be a hash value, also referred to as a Message Authentication Code (MAC) or HMAC. The companion application 12 may send both the first message and the first cryptographic result or HMAC to the client device 4. In some examples, the first message is sent unencrypted or "in-the-clear," with respect to the application-level connection, but it may be encrypted according to the system-level connection.

Upon receiving the first message and the HMAC, the client device 4 may apply the hash function to the first message using the copy of the application session key stored at the client device 4 to generate a second hash value. Applying the hash function to the first message may be the second cryptographic operation. The client device 4 may compare the second hash value to the HMAC. If the second hash value matches the HMAC, it may indicate that the message originated from a party having the application session key (e.g., to generate the HMAC), and therefore is likely to be the companion application 12 that is the counter party to the application-level connection. The client device 4 may similarly use an HMAC in conjunction with a message to authenticate itself to the companion application 12. Similarly, the client device 4 may generate an HMAC for a second message and send the second message and HMAC to the companion application 12. The companion application 12 may apply the hash function to the second message with the application session key to generate a second cryptographic result and may compare the second cryptographic result to the HMAC.

In some examples, the client device 4 may be configured to avoid communicating with the computing device 2 without using the application session key. In this way, the companion application 12 may be the only application executing at the computing device 2 that is configured to communicate with the client device 4. In some examples, the computing device 2 may have multiple application-level connections with the client device 4. For example, the companion application 12 and application 11 may have separate connections with separate encryption keys. The client device 4 may be configured to provide some data or data types via the first connection (e.g., to the companion application 12) and other data or data types via the second connection (e.g., to the application 11).

Figure 4:
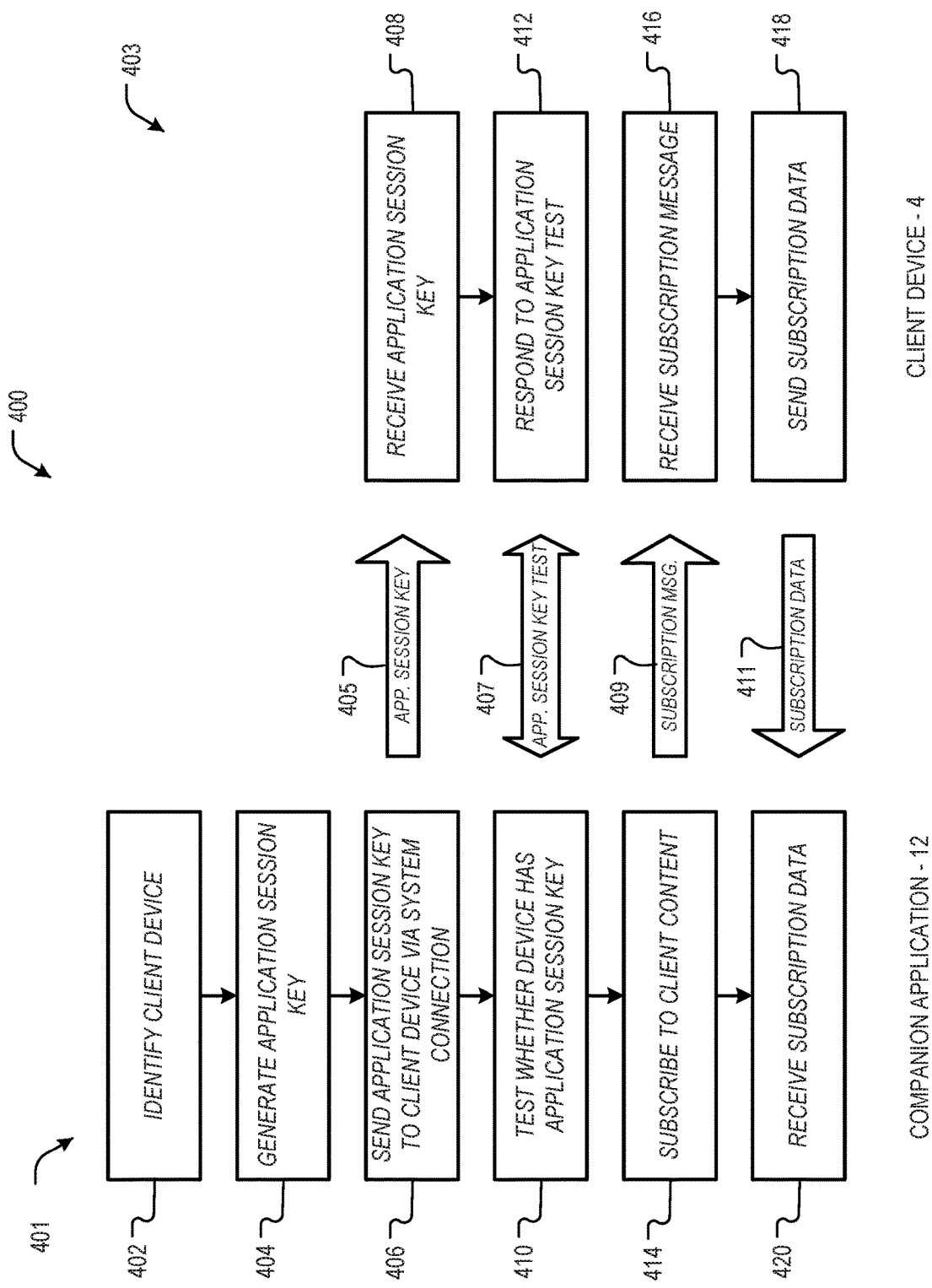
FIG. 4 is a flow chart showing one example of a process flow that may be executed in the environment of FIG. 1 to generate an application channel between an application and a client device.

FIG. 4 is a flow chart showing one example of a process flow 400 that may be executed in the environment 10 of FIG. 1 to generate an application-level connection 6 between an application and a client device. The process flow 400 is described in conjunction with the example environment 10 of FIG. 1, including the computing device 2 and the client device 4. The process flow 400, however, may be executed to implement communications security between any two suitable devices and/or applications. Also, the process flow 400 may be executed, for example, after a system-level connection 8 has been established between the computing device 2 and the client device 4.

The process flow 400 includes two columns. A first column 401 includes actions that are executed by the companion application 12 executing at the computing device 2. A second column 403 includes actions executed by the client device 4 such as, for example, a client OS 20 and/or client application 18. At action 402, the companion application 12 may identify the client device 4. In some examples, the companion application 12 queries the OS 14 to provide a list of paired and/or connected devices. The companion application 12 may determine whether the client device 4 is included in the received list.

At action 404, the companion application 12 may generate an application session key. For example, the companion application 12 may randomly generate a number to be used as the application session key. The companion application 12, or other component, may randomly generate a number, for example, utilizing any random or pseudorandom number generator device and/or algorithm. In some examples where the computing device 2 executes an Android™ operating system, randomly generating a number may include calling the SecureRandom( ) class. In some examples where the computing device 2 executes an iOS™ operating system, randomly generating a number may include calling the srandom( ) function. In some examples, the companion application 12 may store the application session key at a secure memory location, such as the key store location 242 described herein.

At action 406, the companion application 12 may send to the client device 4 an application session key message 405 including the application session key. The application session key message 405 may be sent via the system-level connection 8. For example, the companion application 12 may send the application session key to the OS 14 with a request that it be sent to the client device 4. The OS 14 may encrypt the application session key with the system-level connection key to generate the application session key message 405 the OS 14 may direct the session key message 405 to the client device 4. The client device 4 may receive the application session key message 405 at action 408. Because the client device 4 also has the system-level connection key, it may decrypt the application session key message 405 and retrieve the application session key.

At actions 410 and 412, the companion application 12 and client device 4 may engage in an application session key test 407. According to the application session key test 407, the companion application 12 and client device 4 may exchange various messages to authenticate to one another and/or ensure that both parties have the same application session key. Example application session key tests 407 are provided herein, for example, with reference to FIGS. 7-9.

If an application session key test 407 succeeds (e.g., both parties have a copy of the same application session key), an application-level connection 6 may be created between the companion application 12 and the client device 4. For example, the companion application 12 may create a first message and encrypt the first message with the application session key. The application-encrypted first message may be provided to the OS 14, which may encrypt the application-encrypted first message with the system-level connection key to generate a system-encrypted first message. The system-encrypted first message is then sent to the client device 4. The client device 4 may decrypt the system-encrypted first message with the system-level connection key to generate the application-encrypted first message. The client device 4 may also decrypt the application-encrypted first message to generate the first message in the clear.

Similarly, the client device 4 may create a second message and encrypt the second message with the application session key to generate an application-encrypted second message. The client device 4 may also encrypt the application-encrypted second message with the system-level connection key to generate a system-encrypted second message, which may be sent to the computing device 2. At the computing device 2, the OS 14 may decrypt the system-encrypted second message with the system-level connection key to generate the application-encrypted message. The OS 14 may return the application-encrypted message to the companion application. The companion application 12 may retrieve the application session key associated with the client device 4 and decrypt the application-encrypted message to produce the second message in the clear.

Referring back to FIG. 4, the process flow 400 also shows optional actions 414, 416, 418, 420 that may be executed, for example, when the companion application 12 is to subscribe to a type of data from the client device 4. For example, the client device 4 may be a wearable device collecting activity data about the user (e.g., user activity data), such as a number of steps taken, heart rate, calories consumed, sleep patterns, etc., or other data about a user. The companion application 12 may subscribe to some or all of the captured activity data. In another example, the client device 4 may receive a notification when a social media or other similar event is directed towards a user of the computing device 2. The companion application 12 may subscribe to receive messages upon the occurrence of one or more of these events.

At action 414, the companion application 12 may subscribe to client content, such as biometric data described above. The companion application 12 may send a subscription message 409, or other suitable data request, to the client device 4. The subscription message 409 may include data describing the type of client device data that the companion application 12 will receive. The subscription message 409 may be sent via both the system-level connection 8 and the application-level connection 6. For example, the subscription message 409 may be encrypted with the application session key and with the system-level connection fee. The client device 4 may receive the subscription message at action 416 and perform appropriate decryption.

At 418, the client device 4 may send subscription data 411 to the companion application 12, for example, via the system-level connection 8 and application-level connection 6. The subscription data 411 may include data of the type referenced in the subscription message 409. Subscription data 411 may have been stored at a memory of the client device 4 at the time of the subscription message 409 and/or subsequently captured or otherwise received by the client device 4. In some examples, the client device 4 may be configured to send newly received subscription data to the companion application, for example, as it is received and/or periodically. The companion application may receive the subscription data at 420. The companion application 12 may decrypt the subscription data 411 with the application session key. (E.g., the companion application 12 may receive the subscription data 411 after the OS has decrypted it with the system-level connection key.)

Figure 5:
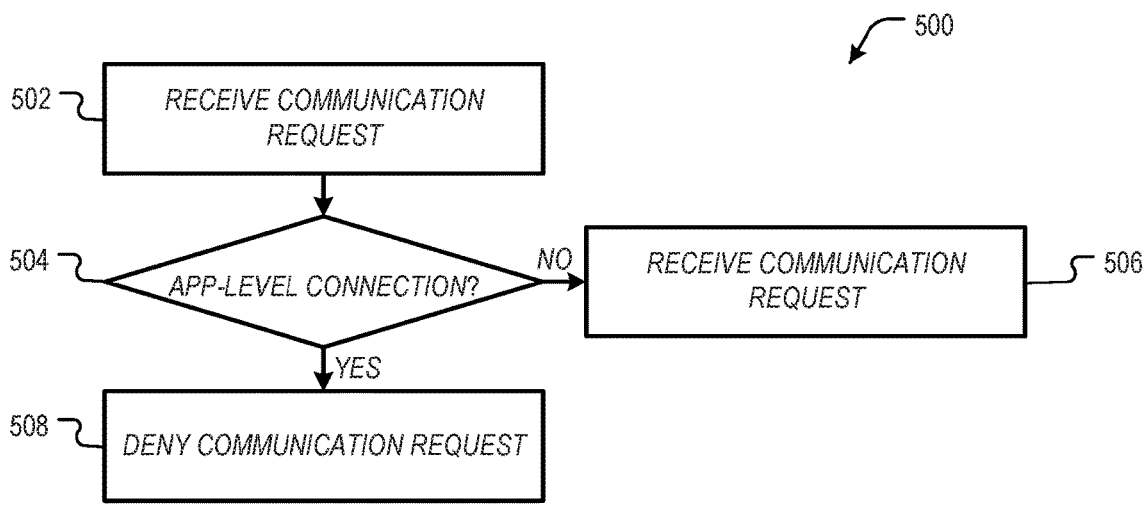
FIG. 5 is flow chart showing one example of a process flow that may be executed by the client device 4 to respond to a communication from the computing device.

In some examples, the client device 4 may be programmed to respond to communications from the computing device in a way that maintains the security of the application-level connection. For example, FIG. 5 is flow chart showing one example of a process flow 500 that may be executed by the client device 4 to respond to a communication from the computing device 2. The actions of the process flow 500 may be executed by any suitable component of the client device 4 including, for example, the client OS 20 and/or the client application 18. Also, the process flow 500 is described in conjunction with the example environment 10 of FIG. 1, including the computing device 2 and the client device 4. The process flow 500, however, may be executed to implement communications security between any two suitable devices and/or applications.

At action 502, the client device 4 may receive a communication request from the computing device 2 (e.g., from an application 11, 12 executing at the computing device 2). At action 504, the client device 4 may determine whether the computing device 2 has an application-level connection 6 with the sender of the communication request. The client device 4 may determine whether it has an application-level connection 6 with the sender in any suitable manner. For example, the client device 4 may decrypt the communication request with the system-level connection key and then determine whether it has an application session key that can decrypt the result. If the client device 4 has more than one active application session key, it may attempt to use all of the active session keys that is possesses. In some examples, the communication request may comprise identifying data indicating the sending application. Accordingly, determining whether the client device 4 has an application-level connection 6 with the sender may include determining whether the client device 4 has an application session key associated with the sender and determining whether the application session key associated with the sender is capable of decrypting the communication request.

If the client device 4 determines at action 504 that it has an application-level connection with the sender of the communication request, it may receive and/or respond to the communication request at action 506. If the client device 4 determines at action 504 that it does not have an application-level connection with the sender of the communication request, it may deny the communication request at action 508. Denying the communication request may include simply failing to respond to the communication request, sending a rejection message to the computing device 2, or any other suitable action indicating that the client device 4 has denied the communication request.

Figure 6:
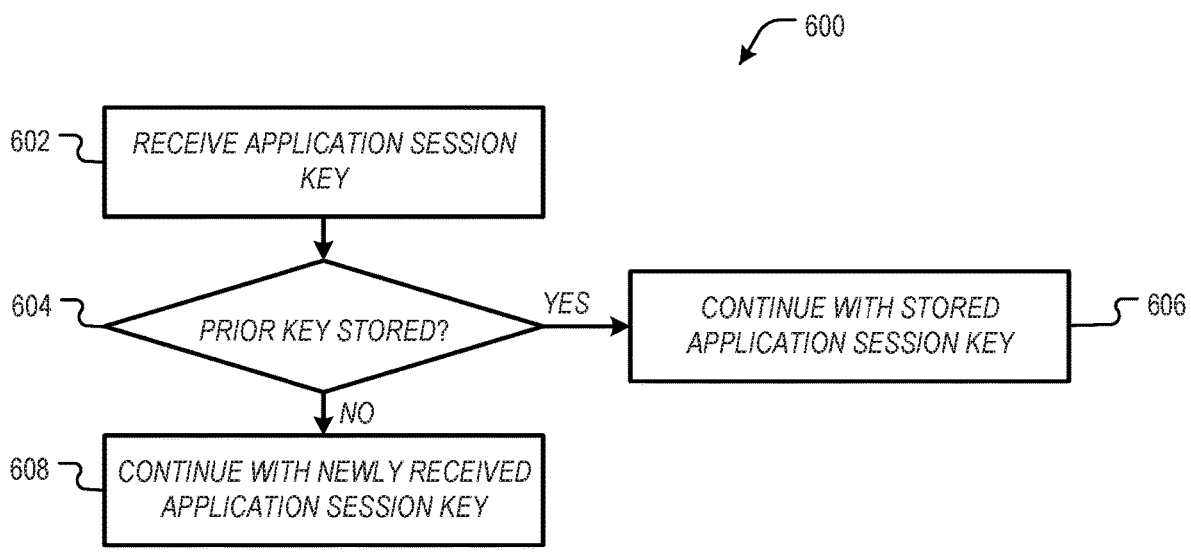
FIG. 6 is a flow chart showing another example of a process flow that may be executed at the client device upon receiving an application session key.

FIG. 6 is a flow chart showing another example of a process flow 600 that may be executed at the client device 4 upon receiving an application session key, for example as described above with respect to action 408. The actions of the process flow 600 may be executed by any suitable component of the client device 4 including, for example, the client OS 20 and/or the client application 18. Also, the process flow 600 is described in conjunction with the example environment 10 of FIG. 1, including the computing device 2 and the client device 4. The process flow 600, however, may be executed to implement communications security between any two suitable devices and/or applications.

At action 602, the client device 4 may receive an application session key. At action 604, the client device 4 may determine whether it has a prior application session key stored. If the client device 4 is programmed to maintain multiple application-level connections, it may determine whether it has an application session key corresponding to a sender of the application session key, for example, by comparing the received application session key to one or more stored application session keys. If no prior application session key is stored, the client device 4 may proceed with the application-level connection using the newly-received application session key at action 608. If a prior application session key is stored, the client device 4 may proceed with the prior application key at action 606. This, as described herein, may reduce the susceptibility of the client device 4 to surreptitious application-level connections.

Figure 7:
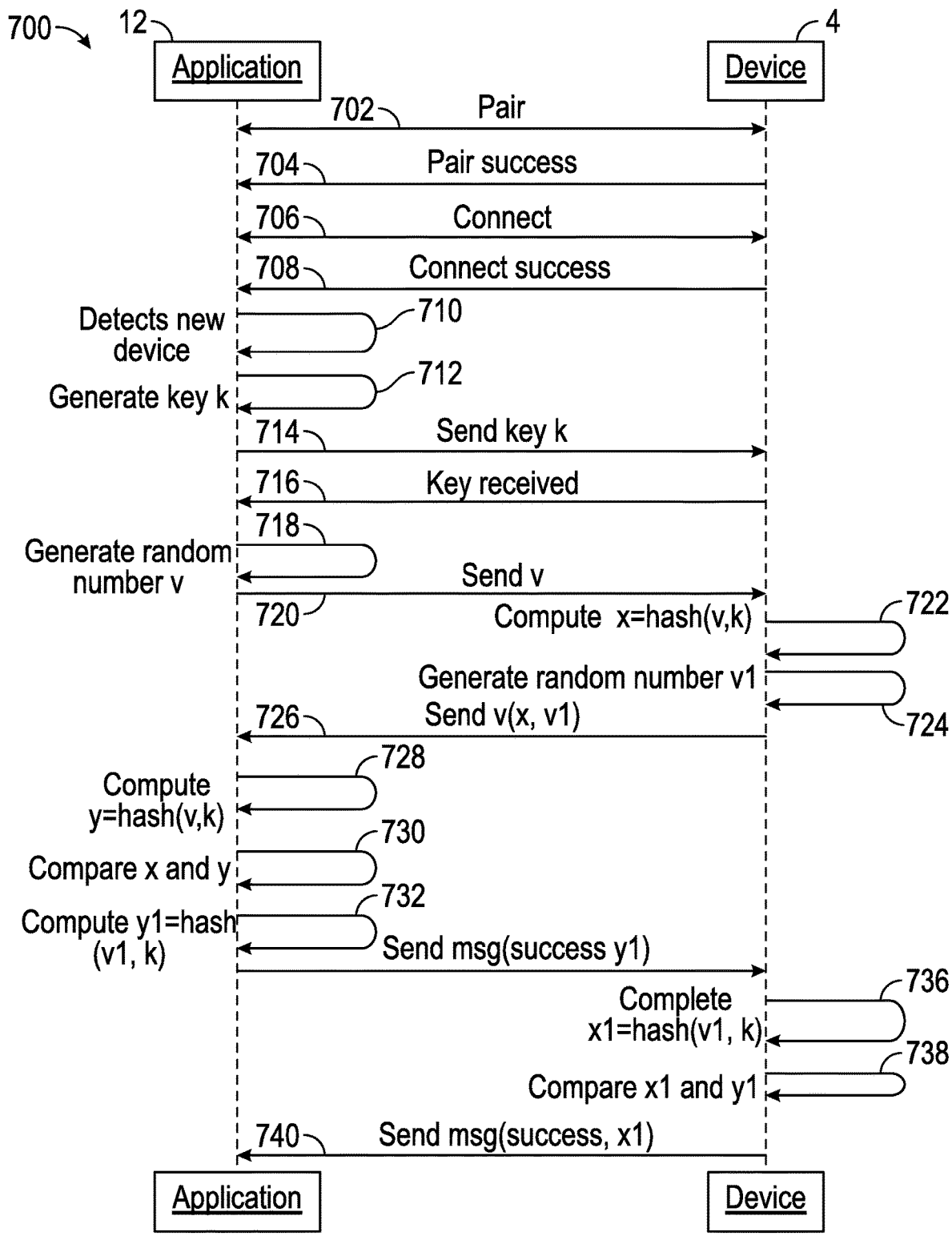
FIGS. 7-10 are timing diagrams showing examples of key exchanges and authentications between the companion application and the client device.

FIG. 7 is a timing diagram 700 showing one example of a key exchange and authentication between the companion application 12 and the client device 4. The timing diagram 700 is described in conjunction with the example environment 10 of FIG. 1, including the computing device 2 and the client device 4. The timing diagram 700, however, may be executed to implement communications security between any two suitable devices and/or applications. The various messages sent according to the timing diagram 700 may be sent, for example, according to the system-level connection 8 (e.g., when the system-level connection 8 is completed). All or part of the timing diagram 700 may be an example of the application session key test 407 described herein with respect to the process flow 400. For example, from the generation of the application session key k at action 712 through message 740 may represent one example of an application session key test 407.

At message 702, the computing device 2 may pair with the client device 4. At message 704, the client device 4 may indicate that the pair was successful. At message 706, the computing device 2 may establish a system-level connection with the client device 4. The client device 4, at message 708, may indicate that the system-level connection was successfully completed. As described herein, messages 702 and 706 may be sent by the companion application 12 and/or by the OS 14, for example, in response to a request from the companion application 12.

At action 710, the companion application 12 may detect a new client device (e.g., the client device 4) has been paired and connected to the computing device. For example, the companion application 12 may query the OS 14 for new client devices and/or the OS 14 may be configured to notify the companion application 12 that the new client device has been connected. At action 712, the companion application may generate an application session key k for the client device 4. At message 714, the companion application 12 may send the application session key k to the client device 4 via the system-level connection. Optionally, the client device 4 may send a reply message 716 indicating that the application session key k was received. In some examples, the client device 4 may execute the process flow 600, as described herein, to determine if it possesses an application session key previously received from the companion application 12. In the example shown in FIG. 7, the client device 4 may have determined that it did not have a previously-received application session key from the companion application, so it proceeds with the newly-received application session key k.

At action 718, the companion application 12 may randomly generate a number v, for example, as described herein, and may send the randomly generated number v to the client device 4 at message 720. The client device 4, at action 722, may apply a hash function to the application session key k and the randomly generated number v to generate a hash value x. Any suitable hash function may be used including, for example, an NIST hash function, a Bernstein hash function, a Fowler-Noll-Vo hash function, etc. The client device 4 may also, at action 724, randomly generate a second number v1. The client device 4 may send the hash value x and the second number v1 to the companion application 12 at message 726.

The companion application 12 may, at action 728, apply the hash function to the number v using the copy of application session key k stored at the computing device 2 to generate a hash value y. The companion application 12 may be programmed to apply the same hash function that the client device 4 applied at action 722. Accordingly, if the copy of the application session key k stored at the computing device 2 matches the copy of the application session key k stored at the client device 4, then the hash value x should be equal to the hash value y. The companion application, at action 730, may compare x and y. In the example timing diagram 700, x and y may be equal. Because x and y are equal, the companion application 12 may determine that the client device 4 is using the same version of the application session key k as is stored at the computing device 2.

The companion application 12 may also, at action 732 apply the hash function to the number v1 and the application session key k (e.g., the copy of the application session key stored at the computing device 2). This may generate a hash value y1. The companion application 12 may send to the client device 4 a message 734 including the hash value y1. Optionally, the message 734 may also indicate that the companion application 12 successfully verified the hash of the number v and the application session key k (e.g., by successfully re-creating the hash).

At action 736, the client device 4 may apply the hash function to the number v1 and the application session key k (e.g., the version of the application session key k stored at the client device 4). At action 738, the client device 4 may compare the hash values x1 and y1. Because, in the example timing diagram 700, the client device 4 and the companion application 12 have the same application session key, x1 may equal y1. The client device 4 may send to the companion application a message 740 indicating that the client device 4 successfully verified the hash of the number v1 and the application session key k (e.g., by successfully re-creating the hash).

Figure 8:
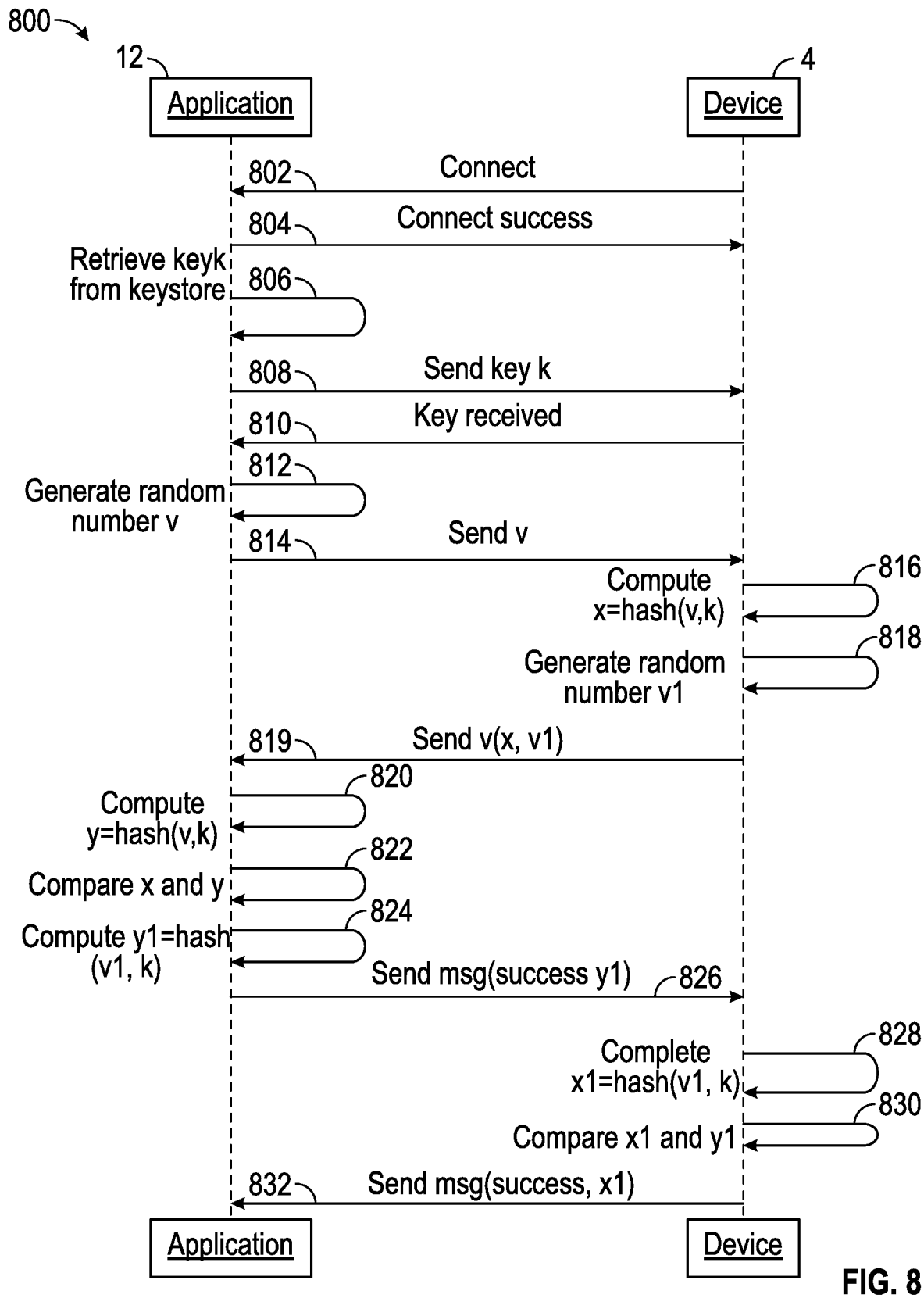

FIG. 8 is a timing diagram 800 showing one example of a key exchange and authentication between the companion application 12 and the client device 4. For example, the timing diagram 800 may show a process executed by the client device 4 and the companion application 12 when client device 4 and companion application 12 have already been connected previously and have already exchanged an application session key, given by k. Also, the timing diagram 800 is described in conjunction with the example environment 10 of FIG. 1, including the computing device 2 and the client device 4. The timing diagram 800, however, may be executed to implement communications security between any two suitable devices and/or applications. The various messages sent according to the timing diagram 800 may be sent, for example, according to the system-level connection 8 (e.g., when the system-level connection 8 is completed).

The timing diagram 800 begins with a connection between the computing device 2 (e.g., the OS 14 thereof) and the client device 4 including a connection message 802 from the computing device 2 and a connection success message 804 from the client device 4 to the computing device 2. In various examples, this may establish the system-level connection 8 upon which subsequent communications between the companion application 12 and client device 4 may be sent.

At action 806, the companion application 12 may retrieve the application session key k from the memory of the computing device 2. For example, the companion application 12 may direct a request to the OS 14 to retrieve the application session key k at a key store memory location, as described herein. The companion application 12 may optionally send the application session key k (e.g., the copy of the application session key k stored at the computing device 2) to the client device 4 in a message 808. The client device 4, in some examples, sends a message 810 to the companion application 12 indicating that the key was received. As described above with respect to the process flow 600, the client device 4, upon receiving the application session key k, may determine that it has a prior key stored for the companion application 12 and, therefore, may proceed with the timing diagram 800 with its stored version of the application session key k, referred to herein as the copy of the application session key k stored at the client device 4.

At action 812, the companion application 12 may randomly generate a number v, for example, as described herein. The companion application may send to the client device 4 a message 814 including the number v. The client device 4, at action 816, may apply a hash function to the received number v and the copy of the application session key k stored at the client device 4 to generate a hash value x. At action 818, the client device 4 may randomly generate another number v1. The client device may send the hash value x and the number v1 to the companion application at message 819.

Upon receiving the message 819, the companion application 12 may, at action 820, apply the hash function to the number v and the copy of the application session key k stored at the computing device 2 to generate another hash value y. At action 822, the companion application 12 may be compare x and y. If the copy of the application session key k stored by the companion application 12, for example, at a key store, matches the copy of the application session key k stored at the client device 4, then x may be equal to y. In the example timing diagram 800, the copies of the application session key k stored by the companion application 12 and the client device 4 may match, so the companion x and y may match.

The companion application 12 may apply the hash function to the number v1 and its copy of the application session key k at action 824 to generate a hash value y1 and may send a message 826 including the hash value y1 and an indication of the success of the compare of x and y. The client device may receive the message 826 and, at action 828 may apply the hash function to the hash value v1 and the copy of the application session key k stored at the client device 4. The client device 4 may compare x1 and y1 at action 832. Because the copies of the application session key stored by the companion application 12 and the client device 4 match in the example timing diagram 800, x1 and x2 may match. Accordingly, the client device 4 may send a message 832 indicating success of the comparison of x1 and y1. Optionally, the message 832 may also include the hash value x1 computed at action 828.

Figure 9:
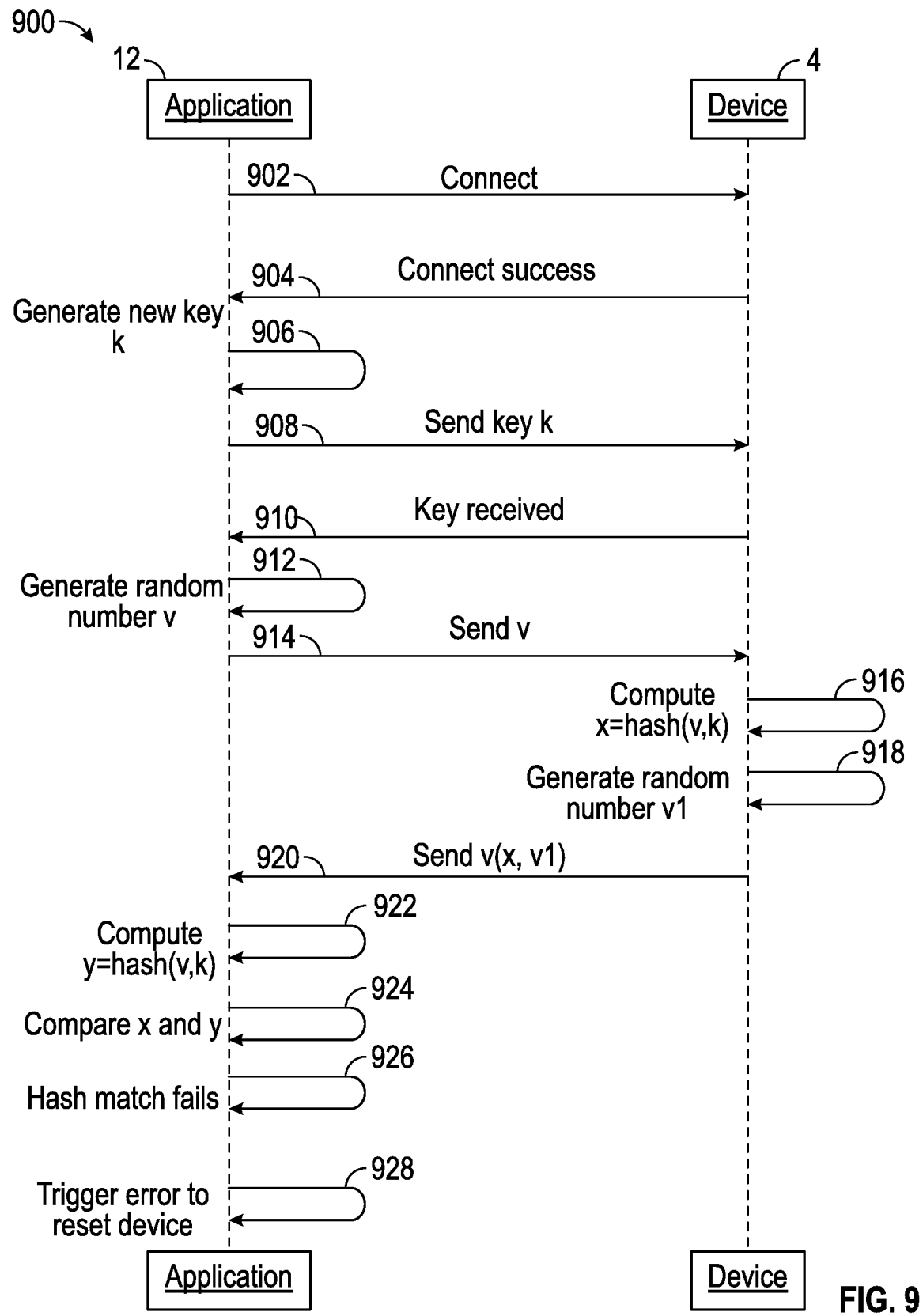

FIG. 9 is a timing diagram 900 showing one example of a key exchange and authentication between the companion application 12 and the client device 4. For example, the timing diagram 900 may show a process executed by the client device 4 and the companion application 12 when the companion application 12 attempts to generate a new application session key k when the client device 4 has a previously-stored application session key k. This may occur, for example, if the companion application 12 is reinstalled on the computing device 2, if the system-level connection 8 between the computing device 2 and the client device 4 is reset, or for any other suitable reason.

The timing diagram 900 begins with a connection between the computing device 2 (e.g., the OS 14 thereof) and the client device 4 including a connection message 902 from the computing device 2 and a connection success message 904 from the client device 4 to the computing device 2. In various examples, this may establish the system-level connection 8 upon which subsequent communications between the companion application 12 and client device 4 may be sent.

At action 906, the companion application 12 may generate an application session key k for the client device 4, referred in the description of the timing diagram 900 as the new key. At message 908, the companion application 12 may send the new key k to the client device 4 via the system-level connection 8. Optionally, the client device 4 may send a reply message 910 indicating that the new key k was received. The client device 4 may execute the process flow 600, as described herein above. The client device 4 may determine that it has a copy of a previously-received application session key k associated with the companion application 12, referred to in the description of the timing diagram 900 as the client-stored key. Accordingly, the client device 4 may complete the remainder of the timing diagram 900 with the client-stored key.

At action 912, the companion application 12 may randomly generate a number v, for example, as described herein, and may send the randomly generated number v to the client device 4 at message 914. The client device 4, at action 916, may apply a hash function to the randomly generated number v and the client-stored key. The client device 4 may also randomly generate a second number v/at action 918. The client device 4 may send the hash value x and the second number v/to the companion application 12 at message 920.

The companion application 12 may, at action 922, apply the hash function to the number v using the new key to find a hash value y. At action 924, the companion application 12 may compare x and y. Because the hash value x was found by applying the hash function with the client-stored key and the hash value y was found by applying the hash function with the new key, x and y may not be equal. The companion application 12 may determine, at action 926, that the match of x and y has failed and at action 928 may prompt a reset of the client device 4. For example, the companion application 12 may send a message to the client device 4 requesting that it reset. In some examples, the companion application 12 may display on an output device of the computing device 2 a request that the user manually reset the client device 4.

Figure 10:
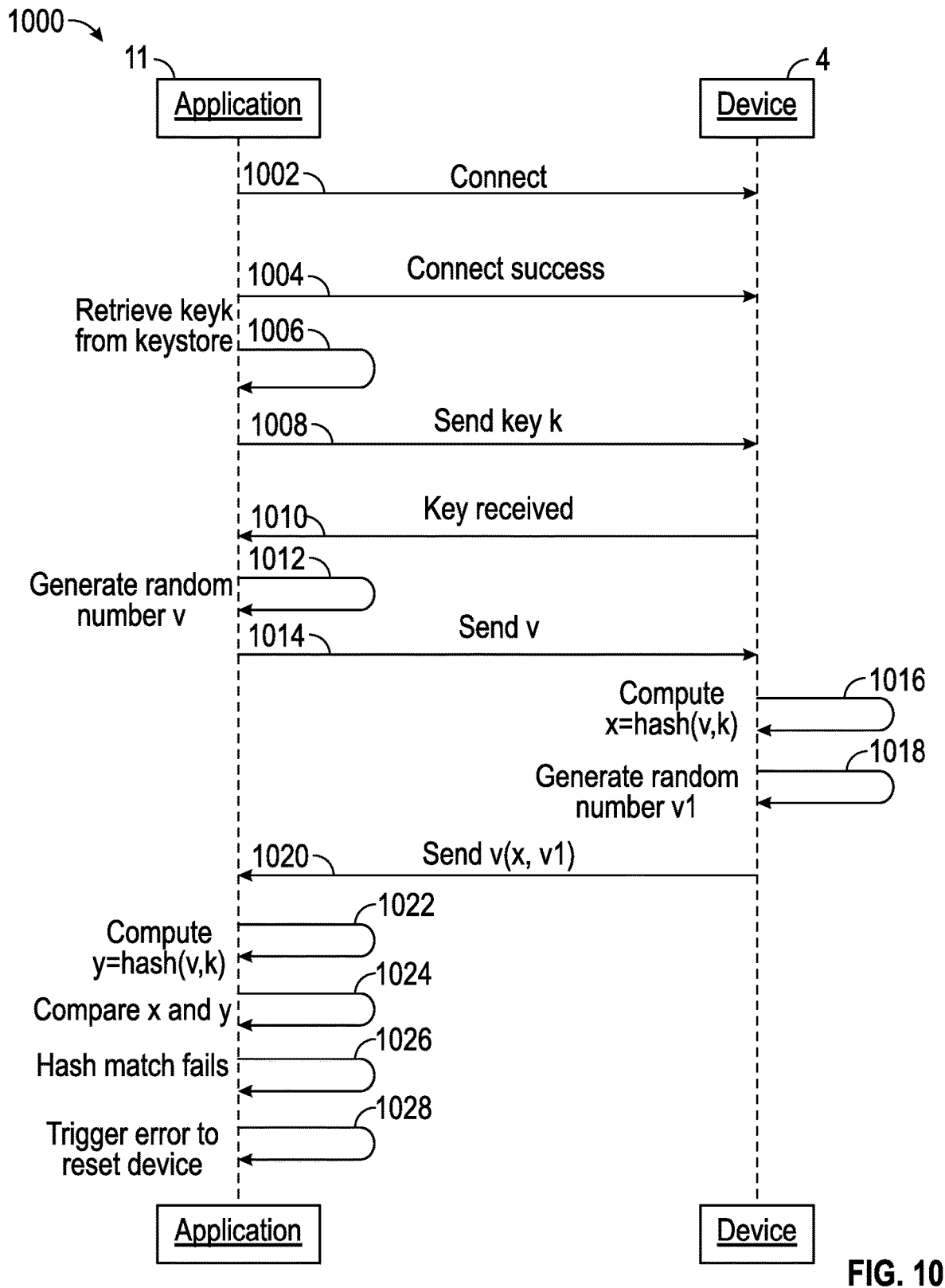

FIG. 10 is a timing diagram 1000 showing one example of a key exchange and authentication between the application 11 and the client device 4. For example, the timing diagram 1000 may show a process executed by the client device 4 and a second application 11 when the application 11 attempts to access the client device 4 after the companion application 12 has generated an application-level connection 6 with the client device. Accordingly, the client device 4, at the outset of the timing diagram 1000, has a stored application session key, referred to in the discussion of the timing diagram 1000 as a client-stored key.

The timing diagram 1000 begins with a connection between the computing device 2 (e.g., the OS 14 thereof) and the client device 4 including a connection message 1002 from the computing device 2 and a connection success message 1004 from the client device 4 to the computing device 2. In various examples, this may establish the system-level connection 8 upon which subsequent communications between the application 11 and client device 4 may be sent.

At action 1006, the application 11 may generate an application session key k for the client device 4 and/or retrieve a previously-generated application session key from its key store. This application session key generated and/or retrieved by the application 11 is referred to as the non-matching key because it does not match the client-stored key. At message 1008, the application 11 may send the non-matching key k to the client device 4 via the system-level connection 8. Optionally, the client device 4 may send a reply message 1010 indicating that the non-matching key k was received. The client device 4 may execute the process flow 600, as described herein above. The client device 4 may determine that it has a copy of the client-stored key. Accordingly, the client device 4 may complete the remainder of the timing diagram 1000 with the client-stored key.

At action 1012, the application 11 may randomly generate a number v, for example, as described herein, and may send the randomly generated number v to the client device 4 at message 1014. The client device 4, at action 1016, may apply a hash function to the randomly generated number v and the client-stored key. The client device 4 may also randomly generate a second number v1 at action 1018. The client device 4 may send the hash value x and the second number v1 to the application 11 at message 1020.

The application 11 may, at action 1022, apply the hash function to the number v using the non-matching key to find a hash value y. At action 1024, the application 11 may compare x and y. Because the hash value x was found by applying the hash function with the client-stored key and the hash value y was found by applying the hash function with the non-matching key, x and y may not be equal. The application 11 may determine, at action 1026, that the match of x and y has failed and at action 1028 may prompt a reset of the client device 4. For example, the application 11 may send a message to the client device 4 requesting that it reset. In some examples, the application 11 may display on an output device of the computing device 2 a request that the user manually reset the client device 4. In some examples, the reset prompt may indicate the application 11 requesting the reset. If the user does not recognize the application 11 as being properly associated with the client device 4, it may decline the reset, which may prevent the application 11 from communicating with the client device 4.

Figure 11:
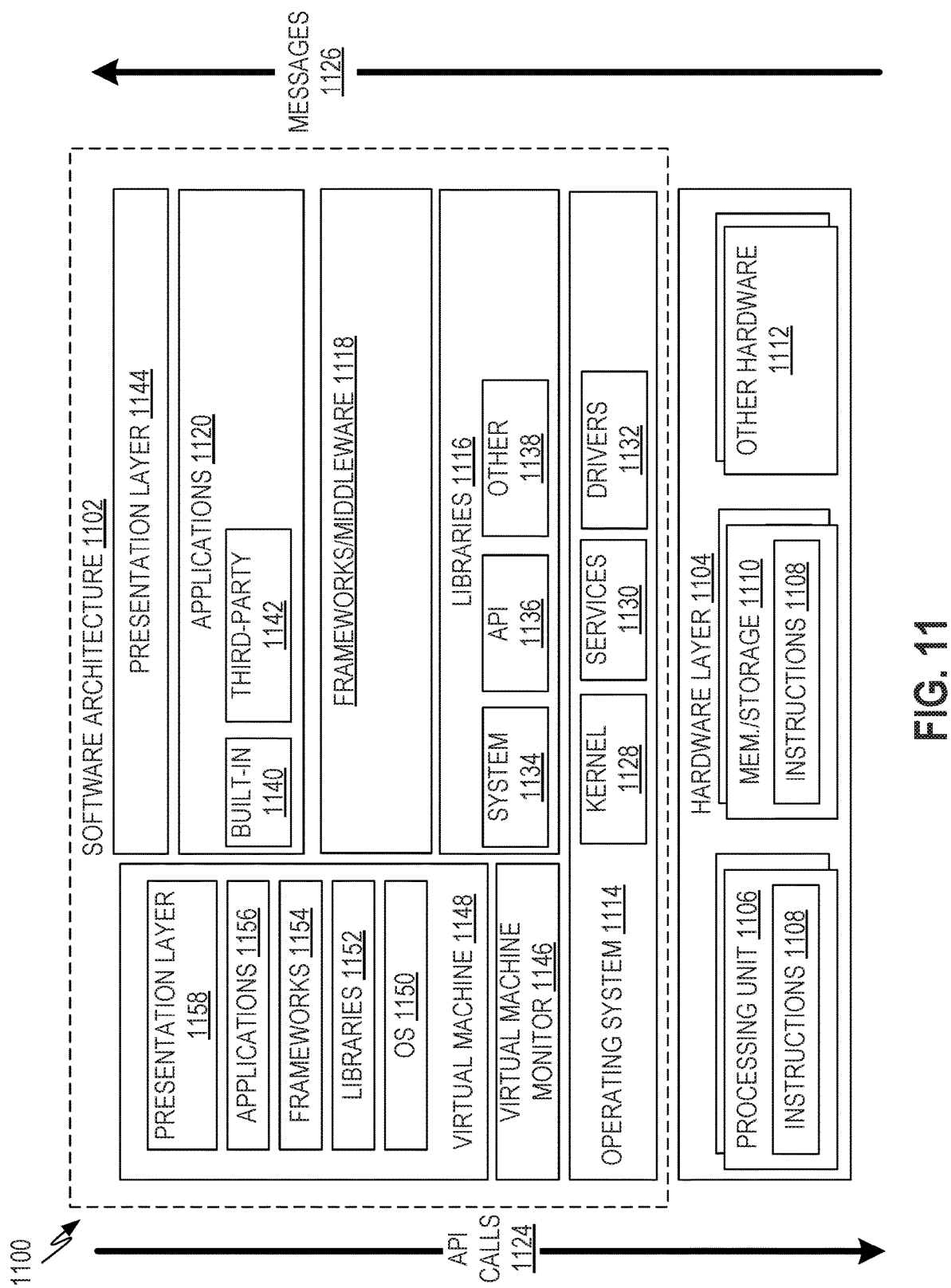
FIG. 11 is a block diagram showing one example of a software architecture for a computing device.

FIG. 11 is a block diagram 1100 showing one example of a software architecture 1102 for a computing device. The architecture 1102 maybe used in conjunction with various hardware architectures, for example, as described herein. FIG. 11 is merely a non-limiting example of a software architecture and many other architectures may be implemented to facilitate the functionality described herein. The software architecture 1102 may be executed on hardware such as, for example, the computing devices 2, 32 and/or the client devices 4, 34. A representative hardware layer 1104 is illustrated and may represent, for example, any of the above referenced computing devices. In some examples, the hardware layer 1104 may be implemented according to the architecture 200 of FIG. 2 and/or the architecture 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, components, and so forth of FIGS. 1 and 3-10. Hardware layer 1104 also includes memory and/or storage modules 1110, which also have executable instructions 1108. Hardware layer 1104 may also comprise other hardware as indicated by 1112 which represents any other hardware of the hardware layer 1104, such as the other hardware illustrated as part of hardware architecture 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" may be separated from the aspects of the application/module that interact with a user.

Some software architectures utilize virtual machines. In the example of FIG. 11, this is illustrated by virtual machine 1148. A virtual machine creates a software environment where applications/modules may execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 may be the same as corresponding layers previously described or may be different.

Figure 12:
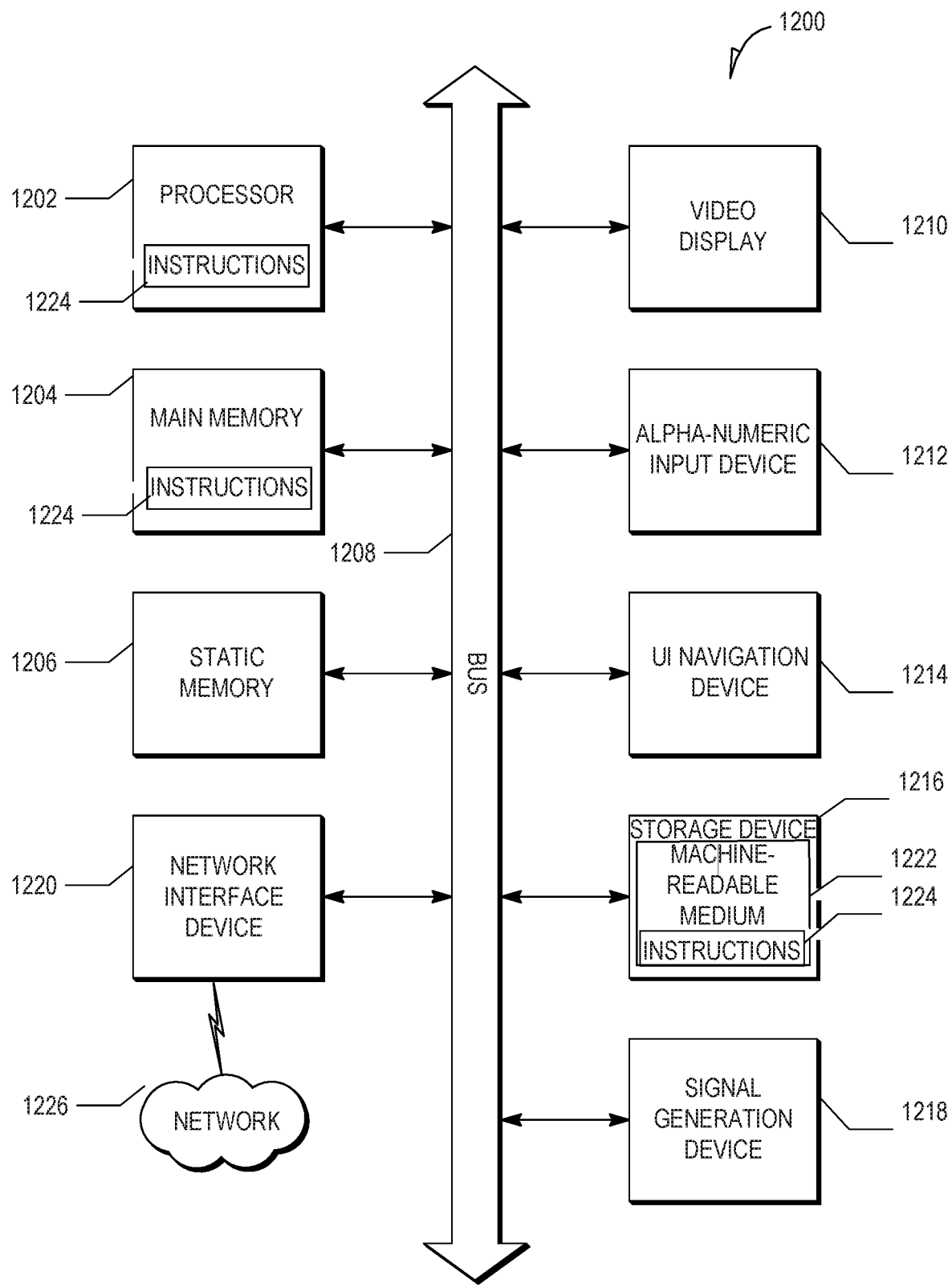
FIG. 12 is a block diagram illustrating a computing device hardware architecture, within which a set or sequence of instructions may be executed to cause the machine to perform examples of any one of the methodologies discussed herein.

FIG. 12 is a block diagram illustrating a computing device hardware architecture 1200, within which a set or sequence of instructions may be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 may further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the architecture 1200, with the main memory 1204, static memory 1206, and the processor 1202 also constituting machine-readable media. Instructions stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a machine-readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

Additional Notes & Examples

Example 1 is a system, comprising: a computing device comprising at least one processor and a memory in communication with the at least one processor, comprising: a connection circuit to generate a connection between the computing device and a client device; a first application executing at the computing device to: send a first application session key to the client device via the connection; perform a cryptographic operation on a first message based at least in part on the first application session key to generate a first cryptographic result; send the first cryptographic result to the client device via the connection; receive a second cryptographic result from the client device via the connection; and determine that the second cryptographic result was obtained with the first application session key.

In Example 2, the subject matter of Example 1 optionally includes an operating system executing at the computing device to: receive from the first application a request to store the first application session key; and store the first application session key at a location of the memory associated with the first application.

In Example 3, the subject matter of any one or more of Examples 1-2 optionally include wherein the first application is also to: randomly generate a first number; send the first number to the client device via the connection; receive a first value from the client device via the connection; apply a hash function to the first number based at least in part on the first application session key to generate a second value; and determine that the first value is equal to the second value.

In Example 4, the subject matter of Example 3 optionally includes wherein the first application is also to: receive a second number from the client device via the connection; apply the hash function to the second number based at least in part on the first application session key to generate a third value; send the third value to the client device via the connection; and receive a success message from the client device via the connection, wherein the success message indicates that the client device verified the third value.

In Example 5, the subject matter of any one or more of Examples 1-4 optionally include wherein the first application is also to: determine that the client device does not possess the first application session key; and prompt a reset of the client device.

In Example 6, the subject matter of any one or more of Examples 1-5 optionally include wherein the first application is also to: generate a second application session key; send the second application session key to the client device; randomly generate a first number; send the first number to the client device; receive a first value from the client device; apply a hash function to the first number based at least in part on the first application session key to generate a second value; determine that the second value is not equal to the first value; and prompt a reset of the client device.

In Example 7, the subject matter of any one or more of Examples 1-6 optionally include a second application executing at the computing device, the second application to: send a third message to the client device, wherein the third message requests data from the client device; and receive a rejection message from the client device.

In Example 8, the subject matter of any one or more of Examples 1-7 optionally include wherein the first message describes a first data type requested by the first application.

In Example 9, the subject matter of any one or more of Examples 1-8 optionally include wherein to perform the cryptographic operation on the first message is to encrypt the first message with the first application session key, and wherein to determine that the second cryptographic result was obtained with the first application session key is to decrypt the second cryptographic result with the first application session key to generate a second message.

In Example 10, the subject matter of any one or more of Examples 1-9 optionally include wherein to determine that the second cryptographic result was obtained with the first application session key is to: apply a hash function to a second message received from the client device based at least in part on the first application session key to generate a third cryptographic result; and determine that the third cryptographic result is equivalent to the second cryptographic result.

In Example 11, the subject matter of any one or more of Examples 1-10 optionally include the client device to: receive a data request via the connection and from a second application executing at the computing device; determine that the client device does not have a second application session key from the second application; and deny the data request.

In Example 12, the subject matter of any one or more of Examples 1-11 optionally include the client device to: receive a second application session key via the connection; receive a number via the connection; apply a hash function to the number based at least in part on the first application session key to generate a first value; and send the first value to the computing device.

In Example 13, the subject matter of any one or more of Examples 1-12 optionally include wherein the first application is also to generate the first application session key.

Example 14 is a method, comprising: generating a connection between the computing device and a client device; sending, by a first application executing at a computing device, a first application session key to the client device via the connection; performing, by the first application, a cryptographic operation on a first message based at least in part on the first application session key to generate a first cryptographic result; sending, by the first application, the first cryptographic result to the client device via the connection; receiving, by the first application, a second cryptographic result from the client device via the connection; and determining, by the first application, that the second cryptographic result was obtained with the first application session key.

In Example 15, the subject matter of Example 14 optionally includes receiving, by an operating system executing at the computing device and from the first application, a request to store the first application session key; and storing, by the operating system, the first application session key at a location of a memory associated with the first application.

In Example 16, the subject matter of any one or more of Examples 14-15 optionally include randomly generating, by the first application, a first number; sending, by the first application, the first number to the client device via the connection; receiving, by the first application, a first value from the client device via the connection; applying, by the first application, a hash function to the first number based at least in part on the first application session key to generate a second value; and determining, by the first application, that the first value is equal to the second value.

In Example 17, the subject matter of Example 16 optionally includes receiving, by the first application, a second number from the client device via the connection; applying, by the first application, the hash function to the second number based at least in part on the first application session key to generate a third value; sending, by the first application, the third value to the client device via the connection; and receiving, by the first application, a success message from the client device via the connection, wherein the success message indicates that the client device verified the third value.

In Example 18, the subject matter of any one or more of Examples 14-17 optionally include determining, by the first application, that the client device does not possess the first application session key; and prompting, by the first application, a reset of the client device.

In Example 19, the subject matter of any one or more of Examples 14-18 optionally include generating, by the first application, a second application session key; sending, by the first application, the second application session key to the client device; randomly generating, by the first application, a first number; sending, by the first application, the first number to the client device; receiving, by the first application, a first value from the client device; applying, by the first application, a hash function to the first number based at least in part on the first application session key to generate a second value; determining, by the first application, that the second value is not equal to the first value; and prompting, by the first application, a reset of the client device.

In Example 20, the subject matter of any one or more of Examples 14-19 optionally include sending, by a second application executing at the computing device, a third message to the client device, wherein the third message requests data from the client device; and receiving, by the second application, a rejection message from the client device.

In Example 21, the subject matter of any one or more of Examples 14-20 optionally include wherein the first message describes a first data type requested by the first application.

In Example 22, the subject matter of any one or more of Examples 14-21 optionally include wherein performing the cryptographic operation on the first message comprises encrypting the first message with the first application session key, and wherein determining that the second cryptographic result was obtained with the first application session key comprises decrypt the second cryptographic result with the first application session key to generate a second message.

In Example 23, the subject matter of any one or more of Examples 14-22 optionally include wherein determining that the second cryptographic result was obtained with the first application session key comprises: applying a hash function to a second message received from the client device based at least in part on the first application session key to generate a third cryptographic result; and determining that the third cryptographic result is equivalent to the second cryptographic result.

In Example 24, the subject matter of any one or more of Examples 14-23 optionally sending, by a second application executing at the computing device, a data request via the connection; and receiving, by the second application, a rejection message denying the data request.

In Example 25, the subject matter of any one or more of Examples 14-24 optionally include sending, by a second application executing at the computing device, a second application session key via the connection to the client device; determining a hash value of a number based at least in part on the second application session key; sending the number and the hash value, by the second application and to the client device via the connection; receiving, by the second application, a rejection message from the client device.

In Example 26, the subject matter of any one or more of Examples 14-25 optionally include generating the first application session key by the first application.

Example 27 is at least one computer readable medium comprising instructions thereon to perform any of the methods of Examples 1-26.

Example 28 is an apparatus comprising means for performing any of the methods of Examples 1-26.

Example 29 is an apparatus comprising: means for generating a connection between the computing device and a client device; means for sending, by a first application executing at a computing device, a first application session key to the client device via the connection; means for performing, by the first application, a cryptographic operation on a first message based at least in part on the first application session key to generate a first cryptographic result; means for sending, by the first application, the first cryptographic result to the client device via the connection; means for receiving, by the first application, a second cryptographic result from the client device via the connection; and means for determining, by the first application, that the second cryptographic result was obtained with the first application session key.

In Example 30, the subject matter of Example 29 optionally includes means for receiving, by an operating system executing at the computing device and from the first application, a request to store the first application session key; and means for storing, by the operating system, the first application session key at a location of a memory associated with the first application.

In Example 31, the subject matter of any one or more of Examples 29-30 optionally include means for randomly generating, by the first application, a first number; means for sending, by the first application, the first number to the client device via the connection; means for receiving, by the first application, a first value from the client device via the connection; means for applying, by the first application, a hash function to the first number based at least in part on the first application session key to generate a second value; and means for determining, by the first application, that the first value is equal to the second value.

In Example 32, the subject matter of Example 31 optionally includes means for receiving, by the first application, a second number from the client device via the connection; means for applying, by the first application, the hash function to the second number based at least in part on the first application session key to generate a third value; means for sending, by the first application, the third value to the client device via the connection; and means for receiving, by the first application, a success message from the client device via the connection, wherein the success message indicates that the client device verified the third value.

In Example 33, the subject matter of any one or more of Examples 29-32 optionally include means for determining, by the first application, that the client device does not possess the first application session key; and means for prompting, by the first application, a reset of the client device.

In Example 34, the subject matter of any one or more of Examples 29-33 optionally include means for generating, by the first application, a second application session key; means for sending, by the first application, the second application session key to the client device; means for randomly generating, by the first application, a first number; means for sending, by the first application, the first number to the client device; receiving, by the first application, a first value from the client device; means for applying, by the first application, a hash function to the first number based at least in part on the first application session key to generate a second value; means for determining, by the first application, that the second value is not equal to the first value; and means for prompting, by the first application, a reset of the client device.

In Example 35, the subject matter of any one or more of Examples 29-34 optionally include means for sending, by a second application executing at the computing device, a third message to the client device, wherein the third message requests data from the client device; and means for receiving, by the second application, a rejection message from the client device.

In Example 36, the subject matter of any one or more of Examples 29-35 optionally include wherein the first message describes a first data type requested by the first application.

In Example 37, the subject matter of any one or more of Examples 29-36 optionally include wherein the means for performing the cryptographic operation on the first message comprises means for encrypting the first message with the first application session key, and wherein determining that the second cryptographic result was obtained with the first application session key comprises decrypt the second cryptographic result with the first application session key to generate a second message.

In Example 38, the subject matter of any one or more of Examples 29-37 optionally include wherein the means for determining that the second cryptographic result was obtained with the first application session key comprises: means for applying a hash function to a second message received from the client device based at least in part on the first application session key to generate a third cryptographic result; and means for determining that the third cryptographic result is equivalent to the second cryptographic result.

In Example 39, the subject matter of any one or more of Examples 29-38 optionally include means for sending, by a second application executing at the computing device, a data request via the connection; and means for receiving, by the second application, a rejection message denying the data request.

In Example 40, the subject matter of any one or more of Examples 29-39 optionally include means for sending, by a second application executing at the computing device, a second application session key via the connection to the client device; means for determining a hash value of a number based at least in part on the second application session key; means for sending the number and the hash value, by the second application and to the client device via the connection; means for receiving, by the second application, a rejection message from the client device.

In Example 41, the subject matter of any one or more of Examples 29-40 optionally include means for generating the first application session key by the first application.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system for secure communication; comprising:
   a computing device comprising at least one processor and a memory in communication with the at least one processor, comprising:
   a connection circuit to generate a connection be the computing device and a client device;
   a first application executing at the computing device to:
   send a first application session key to the client device via the connection;
   perform a cryptographic operation on a first message based at least in part on the first application session key to generate a first cryptographic result;
   send the first cryptographic result to the client device via the connection;
   receive a second message from the client device via the connection, the second message comprising a second cryptographic result;
   determine that the second cryptographic result was obtained with the first application session key;
   determine that the client device does not possess the first application session key; and
   prompt a reset of the client device.

2. The system of claim 1, wherein the first application is also to generate the first application session key.

3. The system of claim 1, further comprising:
   an operating system executing at the computing device to:
   receive from the first application a request to store the first application session key; and
   store the first application session key at a location of the memory associated with the first application.

4. The system of claim 1, wherein the first application is also to:
   randomly generate a first number;
   send the first number to the client device via the connection;
   receive a first value from the client device via the connection;
   apply a hash function to the first number based at least in part on the first application session key to generate a second value; and
   determine that the first value is equal to the second value.

5. The system of claim 4, wherein the first application is also to:
   receive a second number from the client device via the connection;
   apply the hash function to the second number based at least in part on the first application session key to generate a third value;
   send the third value to the client device via the connection; and
   receive a success message from the client device via the connection, wherein the success message indicates that the client device verified the third value.

6. The system of claim 1, wherein the first application is also to:
   generate a second application session key;
   send the second application session key to the client device;
   randomly generate a first number;
   send the first number to the client device;
   receive a first value from the client device;
   apply a hash function to the first number based at least in part on the first application session key to generate a second value;
   determine that the second value is not equal to the first value; and
   prompt a reset of the client device.

7. The system of claim 1, further comprising a second application executing at the computing device, the second application to:
   send a third message to the client device, wherein the third message requests data from the client device; and
   receive a rejection message from the client device.

8. The system of claim 1, wherein the first message describes a first data type requested by the first application and the second message comprises first data of the first data type.

9. The system of claim 1, further comprising the client device to:
   receive a data request via the connection and from a second application executing at the computing device;
   determine that the client device does not have a second application session key from the second application; and
   deny the data request.

10. The system of claim 1, further comprising the client device to:
    receive a second application session key via the connection;

receive a number via the connection;
apply a hash function to the number based at least in part on the first application session key to generate a first value; and
send the first value to the computing device.

11. The system of claim 1, wherein to perform the cryptographic operation on the first message is to encrypt the first message with the first application session key, and wherein to determine that the second cryptographic result was obtained with the first application session key is to decrypt the second cryptographic result with the first application session key to generate a second message.

12. The system of claim 1, wherein to determine that the second cryptographic result was obtained with the first application session key is to:
apply a hash function to a second message received from the client device based at least in part on the first application session key to generate a third cryptographic result; and
determine that the third cryptographic result is equivalent to the second cryptographic result.

13. A method for secure communication, comprising:
generating a connection between a computing device and a client device;
sending, by a first application executing at a computing device, a first application session key to the client device via the connection;
performing, by the first application, a cryptographic operation on a first message based at least in part on the first application session key to generate a first cryptographic result;
sending, by the first application, the first cryptographic result to the client device via the connection;
receiving, by the first application; a second message from the client device via the connection, the second message comprising a second cryptographic result;
determining, by the first application, that the second cryptographic result was obtained with the first application session key;
determining, by the first application, that the client does not possess the first application session key; and
prompting a reset of the client device.

14. The method of claim 13, wherein performing the cryptographic operation on the first message comprises encrypting the first message with the first application session key, and wherein determining that the second cryptographic result was obtained with the first application session key comprises decrypt the second cryptographic result with the first application session key to generate a second message.

15. The method of claim 13, wherein determining that the second cryptographic result was obtained with the first application session key comprises:
applying a hash function to a second message received from the client device based at least in part on the first application session key to generate a third cryptographic result; and
determining that the third cryptographic result is equivalent to the second cryptographic result.

16. At least one non-transitory computer readable medium comprising instructions to perform:
generating a connection between a computing device and a client device;
sending, by a first application executing at a computing device, a first application session key to the client device via the connection;
performing, by the first application, a cryptographic operation on a first message based at least in part on the first application session key to generate a first cryptographic result;
sending, by the first application, the first cryptographic result to the client device via the connection;
receiving, by the first application; a second message from the client device via the connection, the second message comprising a second cryptographic result;
determining, by the first application, that the second cryptographic result was obtained with the first application session key
determining, by the first application, that the client device does not possess the first application session key; and
prompting, by the first application, a reset of the client device.

17. The computer readable media of claim 16, further comprising instructions to perform generating the first application session key by the first application.

18. The computer readable media of claim 16, further comprising instructions to perform:
receiving, by an operating system executing at the computing device and from the first application, a request to store the first application session key; and
storing, by the operating system, the first application session key at a location of a memory associated with the first application.

19. The computer readable media of claim 16, further comprising instructions to perform:
randomly generating, by the first application, a first number;
sending, by the first application, the first number to the client device via the connection;
receiving, by the first application, a first value from the client device via the connection;
applying, by the first application, a hash function to the first number based at least in part on the first application session key to generate a second value; and
determining, by the first application, that the first value is equal to the second value.

20. The computer readable media of claim 19, further comprising instructions to perform:
receiving, by the first application, a second number from the client device via the connection;
applying, by the first application, the hash function to the second number based at least in part on the first application session key to generate a third value;
sending, by the first application, the third value to the client device via the connection; and
receiving, by the first application, a success message from the client device via the connection, wherein the success message indicates that the client device verified the third value.

21. The computer readable media of claim 16, further comprising instructions to perform:
generating, by the first application, a second application session key;
sending, by the first application, the second application session key to the client device;
randomly generating, by the first application, a first number;
sending, by the first application, the first number to the client device;
receiving, by the first application, a first value from the client device;

applying, by the first application, a hash function to the first number based at least in part on the first application session key to generate a second value;

determining, by the first application, that the second value is not equal to the first value; and prompting, by the first application, a reset of the client device.

22. The computer readable media of claim 16, further comprising instructions to perform:

sending, by a second application executing at the computing device, a third message to the client device, wherein the third message requests data from the client device; and receiving, by the second application, a rejection message from the client device.

23. The computer readable media of claim 16, wherein the first message describes a first data type requested by the first application and the second message comprises first data of the first data type.

24. The computer readable media of claim 16, further comprising instructions to perform:

sending, by a second application executing at the computing device, a data request via the connection; and receiving, by the second application, a rejection message denying the data request.

25. The computer readable media of claim 16, further comprising instructions to perform:

sending, by a second application executing at the computing device, a second application session key via the connection to the client device;

determining a hash value of a number based at least in part on the second application session key;

sending the number and the hash value, by the second application and to the client device via the connection; and receiving, by the second application, a rejection message from the client device.

26. The computer readable media of claim 16, wherein performing the cryptographic operation on the first message comprises encrypting the first message with the first application session key, and wherein determining that the second cryptographic result was obtained with the first application session key comprises decrypt the second cryptographic result with the first application session key to generate a second message.

27. The computer readable media of claim 16, wherein determining that the second cryptographic result was obtained with the first application session key comprises:

applying a hash function to a second message received from the client device based at least in part on the first application session key to generate a third cryptographic result; and determining that the third cryptographic result is equivalent to the second cryptographic result.

* * * * *

UNITED STATES PATENT AND TRADEMARK OFFICE
CERTIFICATE OF CORRECTION

PATENT NO. : 10,764,059 B2  
APPLICATION NO. : 15/169245  
DATED : September 1, 2020  
INVENTOR(S) : Hernacki et al.

Page 1 of 1

It is certified that error appears in the above-identified patent and that said Letters Patent is hereby corrected as shown below:

In the Claims

In Column 23, Line 44, in Claim 1, delete "communication;" and insert --communication,-- therefor In Column 23, Line 48, in Claim 1, delete "be" and insert --between-- therefor In Column 25, Line 35, in Claim 13, delete "application;" and insert --application,-- therefor In Column 25, Line 42, in Claim 13, after "client", insert --device--

In Column 26, Line 7, in Claim 16, delete "application;" and insert --application,-- therefor Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*